United States Patent [19]

DeCarlo

[11] Patent Number: 4,591,115

[45] Date of Patent: May 27, 1986

[54] AUTOMATIC/MANUAL FUEL TANK SUPPLY BALANCE SYSTEM

[75] Inventor: Joseph D. DeCarlo, Bridgeport, Conn.

[73] Assignee: The United States of America as represented by the Secretary of the Navy, Washington, D.C.

[21] Appl. No.: 662,337

[22] Filed: Oct. 18, 1984

[51] Int. Cl.⁴ .................. B64C 17/10; B64D 37/16
[52] U.S. Cl. ................. 244/135 C; 137/255; 137/263; 137/266
[58] Field of Search ............ 137/255, 262, 263, 265, 137/266; 244/135

[56] References Cited

U.S. PATENT DOCUMENTS

| | | | |
|---|---|---|---|
| 1,776,877 | 9/1930 | Yonkese | 244/135 C |
| 2,356,786 | 8/1944 | Harman et al. | 244/135 C |
| 2,394,431 | 2/1946 | Curtis et al. | 137/263 |
| 2,516,150 | 7/1950 | Samiran | 158/36.3 |
| 2,580,467 | 1/1952 | Samiran | 244/135 C |
| 2,704,117 | 3/1955 | Samiran | 137/266 |
| 2,823,880 | 2/1958 | Bergeson | 244/135 |
| 2,926,688 | 3/1960 | Muma et al. | 137/263 |
| 2,966,921 | 1/1961 | Whiteman | 137/266 |
| 3,323,534 | 6/1967 | Johnson et al. | 137/101.21 |
| 3,547,141 | 12/1970 | Alexander et al. | 137/263 |
| 3,782,400 | 1/1974 | Hardison et al. | 137/39 |
| 3,981,321 | 9/1976 | Risse et al. | 137/255 |
| 3,982,399 | 9/1976 | Rookey | 60/706 |
| 4,312,372 | 1/1982 | Amos et al. | 137/266 |

Primary Examiner—Galen Barefoot
Attorney, Agent, or Firm—Robert F. Beers; Harvey A. David

[57] ABSTRACT

A multi-engine helicopter fuel supply balance system effects automatic transfer of fuel from a larger tank to a smaller tank in response to low fuel level in the smaller tank when in automatic mode, and effects a transfer of a predetermined quantity of fuel between selected tanks by timed operation of a constant delivery pump when in manual mode.

1 Claim, 2 Drawing Figures

AUTOMATIC/MANUAL FUEL TANK SUPPLY BALANCE SYSTEM

BACKGROUND OF THE INVENTION

This invention relates to improvements in fuel supply systems for multi-engine aircraft, and more particularly to a system for transferring fuel among a plurality of fuel tanks in order to balance or equalize the fuel availability to all engines.

Historically, multi-engine aircraft fuel tanks (one per engine) were configured to be of equal capacity, obviating the need for any type of fuel balancing system.

Plural tank fuel systems for multiple and single engine aircraft are also known wherein flow control provisions automatically effect the draining of the tanks in a sequential manner so that a known tank is the last to be used. The systems are particularly useful where auxiliary external tanks are designed to be dropped when empty. An example of such a system is described in U.S. Pat. No. 2,516,150.

Other plural tank systems are known that provide for automatic scheduling of withdrawal of fuel from a plurality of fuel tanks so as to maintain the center of gravity of the aircraft in a desired range as exemplified by U.S. Pat. No. 2,823,880, while U.S. Pat. No. 3,323,534 discloses a system for controlling the distribution of fuel among a plurality of tanks during filling, for the same purpose.

While the mentioned prior art systems are useful in their intended circumstances, there has arisen a need for a fuel system suitable for use in a multi-engine helicopter, such as the Sikorsky CH-53E helicopter having three main engines served by four tanks, namely a forward and a rear tank in each of two (right and left) side sponsons. Each of the rear tanks serves one main engine, while the two front tanks serve the third main engine. The rear tanks are smaller than the front tanks, and during normal operation it is desirable that fuel be transferred automatically from the two larger front tanks to replenish fuel in the smaller rear tanks. It is also desirable to provide manual control of semi-automatic or incremental transfer of fuel between any of the tanks and from any selected tank to the others during mission operations or during in-flight refueling.

SUMMARY OF THE INVENTION

With the foregoing in mind, it is a primary object of this invention to provide an improved fuel supply system for a multi-engine aircraft wherein the engines draw from tanks of differing capacity, and which system automatically transfers fuel from the larger tank or tanks to smaller tanks to balance the portion of the total fuel supply available to each engine with that available to the others.

As another important object the invention aims to provide a fuel use balancing and transfer system particularly suited to multi-engined helicopters having tankage divided between larger and smaller tanks and which is operable in a manually initiated, semi-automatic mode for transferring predetermined increments of fuel between selected tanks.

Yet another object is to provide a system of the foregoing character that is simple and reliable in operation, and which provides the pilot with a variety of fuel management options through simple control panel push-button operation.

The invention may further be said to reside in certain novel constructions, combinations and relations of parts by which the foregoing objects and advantages, as well as others which will be made apparent from the following description, are achieved.

DESCRIPTION OF THE PREFERRED EMBODIMENT

Figure 1:
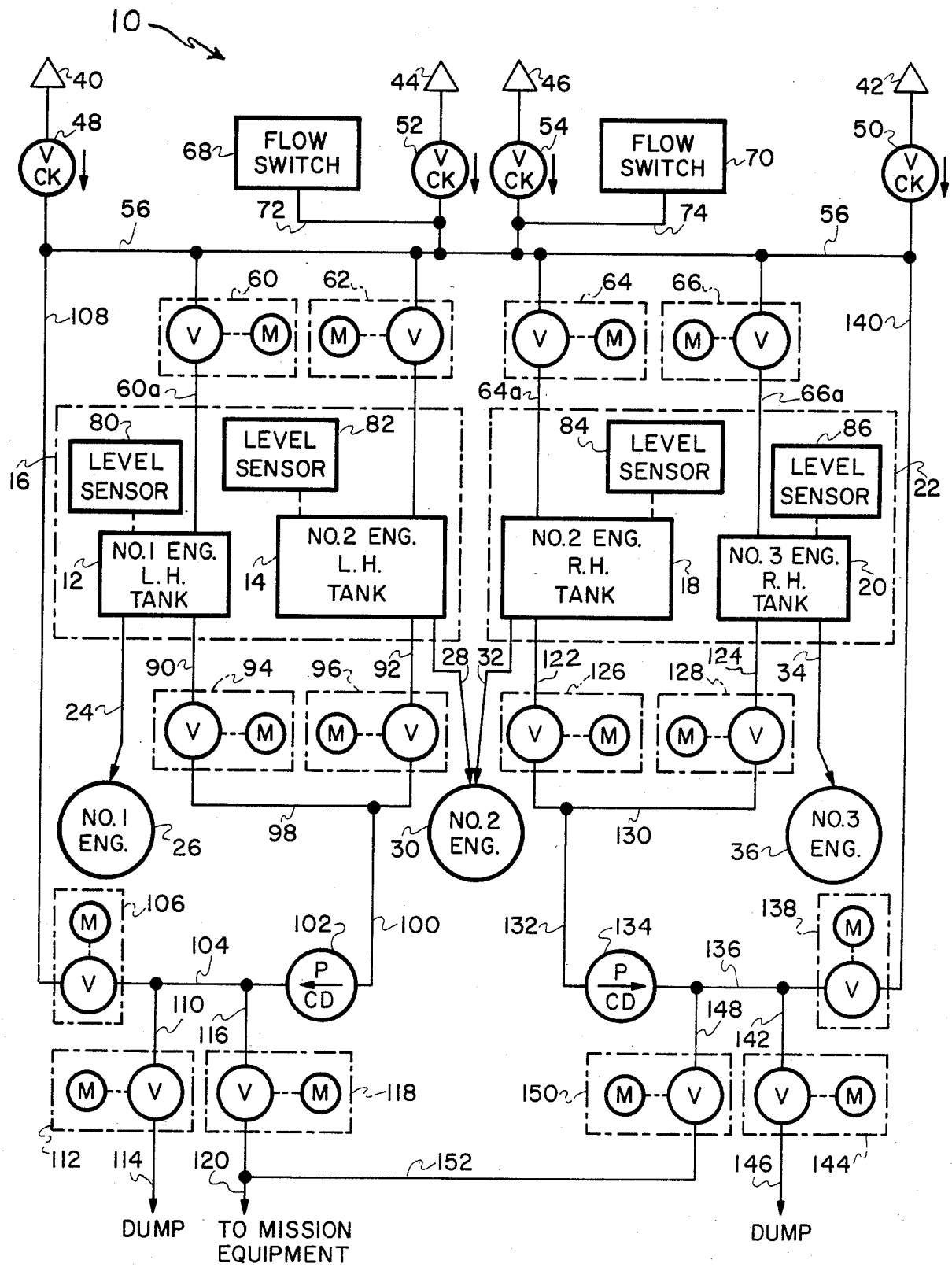
FIG. 1 is a schematic illustration of a fuel tank supply balance system embodying the invention.

As an exemplary preferred embodiment of the invention, a fuel tank balance supply system is described herein as being in association with a helicopter having three engines served by four individual fuel tanks, two of which are larger than the other two, as in a Sikorsky MH53E helicopter which has a front and a rear tank in each of the left and right sponsons. Referring to FIG. 1, wherein flow lines represent liquid fuel paths, a fuel tank balance supply system is indicated generally at 10 and comprises fuel tanks 12 and 14 located in the left hand sponson 16, and tanks 18 and 20 located in the right hand sponson 22. Tank 12, which is the rear tank of sponson 16 supplies fuel via line 24 to the No. 1 engine 26. Tank 14 supplies fuel via line 28 to the No. 2 engine 30. Tank 18 supplies fuel to the No. 2 engine 30 via line 23, and tank 20 supplies fuel via line 34 to the No. 3 engine 36. Tanks 14 and 18 are larger than tanks 12 and 20, and the combined volumes of tanks 14 and 18 are directly available to the No. 2 engine 30.

The tanks 12, 14, 18 and 20 are adapted to be filled or topped-off while the helicopter is at rest through either of left and right hand filler or fueling connections 40 and 42. The helicopter can be refueled in flight, either while hovering over a supplying ship via fueling connection 44 or while in flight from a tanker aircraft via a fueling connection 46. It will be understood that the connections 44 and 46 involve specialized fittings or probes the description of which is not necessary to an understanding of the invention. Fueling connections 40, 42, 44, and 46 are connected through check valves 48, 50, 52, and 54, respectively, with a common line 56. Line 56 is connected via electric motor operated gate valves 60, 62, 64, and 66 to the respective inlet lines 60a, 62a, 64a, and 66a, of tanks 12, 14, 18 and 20, respectively. Flow responsive switches 68 and 70 are connected as shown at 72 and 74 for use in indicating reception of fuel during in-flight replenishing.

Tanks 12, 14, 18 and 20 are provided with full level sensors 80, 82, 84, and 86 of known type for providing electrical signals representative of fuel levels or quantities for display by suitable indicators and for use in control of fuel transfer between or among the tanks in a manner that will later be made apparent.

The left hand tanks 12 and 14 have fuel outlet lines 90 and 92, respectively connected through motor operated valves 94 and 96 and lines 98, 100 to the inlet side of an electrically driven, constant delivery pump 102. By constant delivery is meant that when the pump is running the volume rate of delivery is constant. Pump 102 has its output side connected via line 104, motor operated valve 106 and line 108 to the common fuel line 56. The output line 104 of pump 102 is further connected via a line 110 and a motor operated valve 112 to a fuel dump discharge line 114, and via a line 116 and a motor operated valve 118 to a mission equipment fuel supply line 120.

The right hand tanks 18 and 20 have fuel outlet lines 122 and 124, respectively connected through valves 126 and 128 and lines 130, 132 to the inlet side of an electrically driven, constant delivery pump 134. Pump 134 has its output side connected via line 136, valve 138, and line 140 to the common fuel line 56. The output line 136 of pump 134 is further connected via a line 142 and a valve 144 to a fuel dump discharge line 146, and via a line 148, a valve 150 and line 152 to the misson equipment fuel supply line 120.

Figure 2:
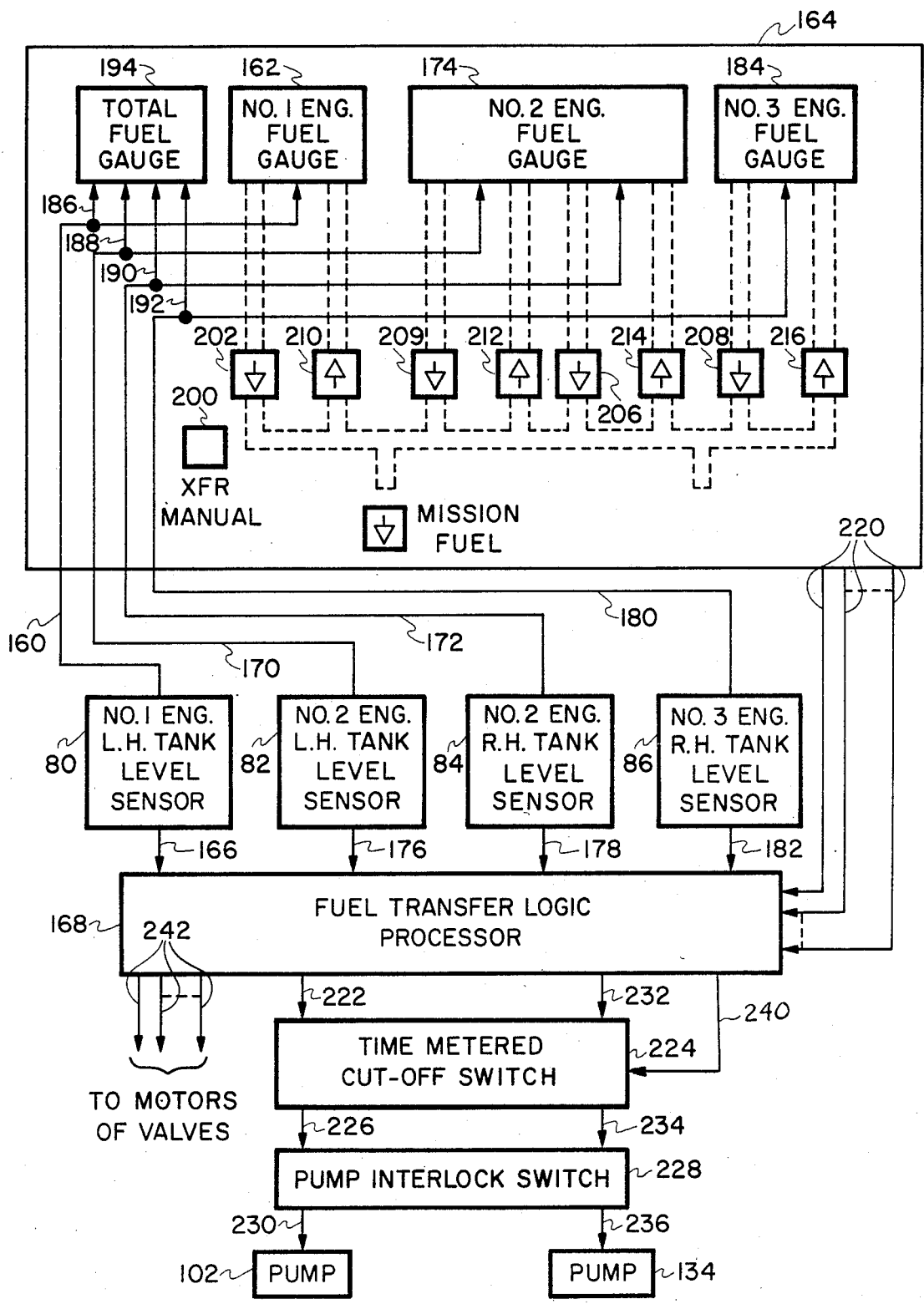
FIG. 2 is a schematic illustration of control and display means for the system of FIG. 1.

Turning now to FIG. 2, where flow lines represent electrical signals or power paths, the level sensor 80 is connected via line 160 to an engine No. 1 fuel quantity indicator or gauge 162 forming part of a control panel 164, and via line 166 to a transfer logic processor 168, conveniently comprising an on-board computer having general purpose capabilities. Level sensors 82 and 84 are connected by lines 170, 172 to an engine No. 2 fuel quantity indicator 174, which may conveniently show in addition the individual quantities in tanks 14 and 18. The level sensors 82 and 84 are connected to provide input via lines 176, 178 to the transfer logic processor 168. Level sensor 86 is connected as shown by lines 180, 182 to a No. 3 engine fuel quantity indicator 184 and the transfer logic 168, respectively. Further, the level sensors may be connected as shown by lines 186, 188, 190, and 192 to a fuel totalizing indicator 194.

The control panel 164 includes a manual transfer mode selector button switch 200 together with other button switches 202, 204, 206, and 208 that select from which tank or tanks fuel will be transferred in manual mode, and switches 210, 212, 214, and 216 that select the tank or tanks to which fuel will be delivered in manual mode transfer, or during refueling. Electrical signals corresponding to the selection of tanks by those button switches is applied to the logic processor 168 as shown by lines 220.

The logic processor 168 is connected to pump 102 via line 222, a time metered cut-off switch 224, line 226, a pump interlock switch 228, and line 230. Similarly, the processor 168 is connected to pump 134 as shown by line 232, time metered cut-off switch 224, line 234, interlock switch 228, and line 236. The interlock switch 228 is responsive to energization of either of the pumps 102 or 134 to prevent simultaneous operation of the other of the pumps. The time metered cut-off switch is responsive, via line 240, to initiation of a manual transfer to serve as timing means to terminate operation of pump 102 or 134 after a predetermined time during which the operating pump will have delivered a predetermined volume or weight of fuel, for example 1000 lbs.

The control panel 164 also includes a mission fuel push button switch 242 for selecting fuel transfer in the manual mode to a remote utilization means via line 120 of FIG. 1. An inflight fueling probe may be extended by switch 244 for refueling the system via the connection 46 of FIG. 1.

The transfer logic processor 168 of the control means is connected by lines collectively indicated at 242 to the motor operated valves 60, 62, 64, 66, 94, 96, 106, 112, 118, 126, 128, 138, 144, and 150 for appropriate operation thereof to effect selected fuel transfer or delivery in the automatic and manual modes, as well as during refueling. Upon timed cut-off of fuel transfer under the manual mode, the system returns to automatic mode. The operator must make successive manual initiations of fuel transfers to effect transfers in increments of the 1000 lb. or other predetermined incremental quantities for which the system has been previously programmed. In the event such an increment would bring any tank from which a transfer is selected below a predetermined minimum level, the system will terminate the transfer when that minimum is reached.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. In combination with a helicopter having first, second, and third main engines, a fuel supply balance system comprising:

first, second, third and fourth fuel tanks, said first and fourth fuel tanks each being smaller in volume than either of said second and third fuel tanks and being connected to deliver fuel directly to said first and said third engines, respectively, and said second and third tanks being connected to deliver fuel directly to said second engine;

a common fuel line for delivery of fuel to each of said tanks;

first, second, third and fourth electrically operated valves connected between said common fuel line and respective ones of said first, second, third, and fourth tanks;

first and second constant delivery pumps;

fifth and sixth electrically operated valves connecting said first and second tanks to said first constant delivery pump, and seventh and eighth electrically operated valves connecting said third and fourth tanks to said second constant delivery pump;

first, second, third and fourth level sensing means associated with said first, second, third, and fourth tanks, respectively, for providing electrical signals corresponding to the quantities of fuel in said tanks;

control means having manual and automatic modes of initiation and responsive in said automatic mode to said electrical signals corresponding to a fuel decrease to a predetermined minimum quantity of fuel in either of said first and fourth tanks to initiate operation of a corresponding one of said pumps and actuation of appropriate ones of said valves so as to automatically effect transfer of a predetermined incremental quantity of fuel from one of said second and third tanks to the tank having said fuel decrease to said predetermined minimum quantity; and said control means further comprising interlock means for preventing operation of both of said pumps simultaneously, manually operated means, operable in said manual mode, for selectively ordering an incremental transfer of fuel from any one of said tanks to any other one of said tanks, and timing means, operative in said manual mode, for automatically terminating said incremental transfer upon transfer of fuel by running of one of said pumps for a predetermined time period corresponding to transfer of a predetermined weight of fuel.

* * * * *